United States Patent [19]
Daoud

[11] Patent Number: 5,910,642
[45] Date of Patent: Jun. 8, 1999

[54] EXPANDABLE ENCLOSURE FOR TELECOMMUNICATIONS APPLICATIONS

[75] Inventor: Bassel H. Daoud, Parsippany, N.J.

[73] Assignee: Lucent Technologies Inc., Murray Hill, Del.

[21] Appl. No.: 08/924,025

[22] Filed: Aug. 29, 1997

[51] Int. Cl.[6] .................................................. H01H 9/02
[52] U.S. Cl. ............................................ 174/57; 312/308
[58] Field of Search ................................ 174/50, 57, 67; 361/641, 645; 312/107, 108, 308, 310; 220/3.7, 3.8, 3.92, 3.94, 4.02, 242

[56] References Cited

U.S. PATENT DOCUMENTS

| | | | |
|---|---|---|---|
| 382,726 | 5/1888 | Patterson | 220/3.8 X |
| 629,445 | 7/1899 | Hunt | 174/67 X |
| 683,579 | 10/1901 | Swoboda | 174/67 X |
| 2,989,206 | 6/1961 | McAfee | 220/3.7 |
| 4,967,924 | 11/1990 | Murofushi et al. | 220/3.8 |
| 5,189,256 | 2/1993 | Epple | 174/50 |
| 5,218,169 | 6/1993 | Riceman | 174/67 |
| 5,245,507 | 9/1993 | Ericksen | 174/67 X |
| 5,402,902 | 4/1995 | Bouley | 220/3.7 X |
| 5,527,993 | 6/1996 | Shotey et al. | 174/67 |
| 5,770,817 | 6/1998 | Lo | 174/57 |

*Primary Examiner*—Dean A. Reichard

[57] ABSTRACT

An enclosure having a base and a cover defining a chamber used to hold telecommunications hardware for splicing and/or connecting to a cable can be expanded in volume by removing the cover from the base and mounting a mid layer between the base and the cover. Depending on whether or not the mid layer is configured with a mounting plane, the expanded enclosure will have either a single larger chamber (i.e., mid layer without a mounting plane) or two chambers (i.e., mid layer with a mounting plane). In either case, the enclosure can be expanded in the field without dismounting the base or even disturbing any of the electrical connections housed within the base.

14 Claims, 10 Drawing Sheets

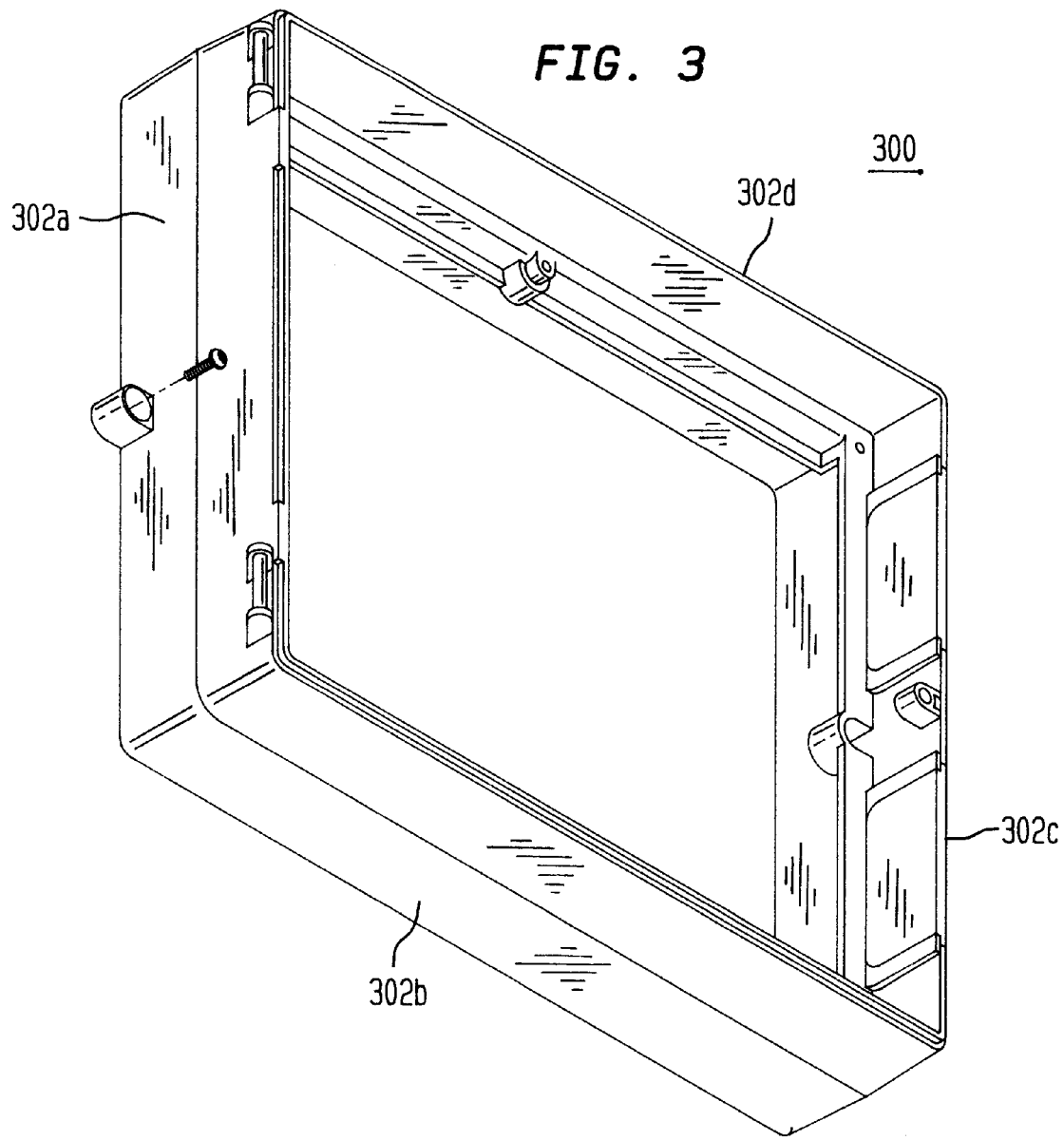

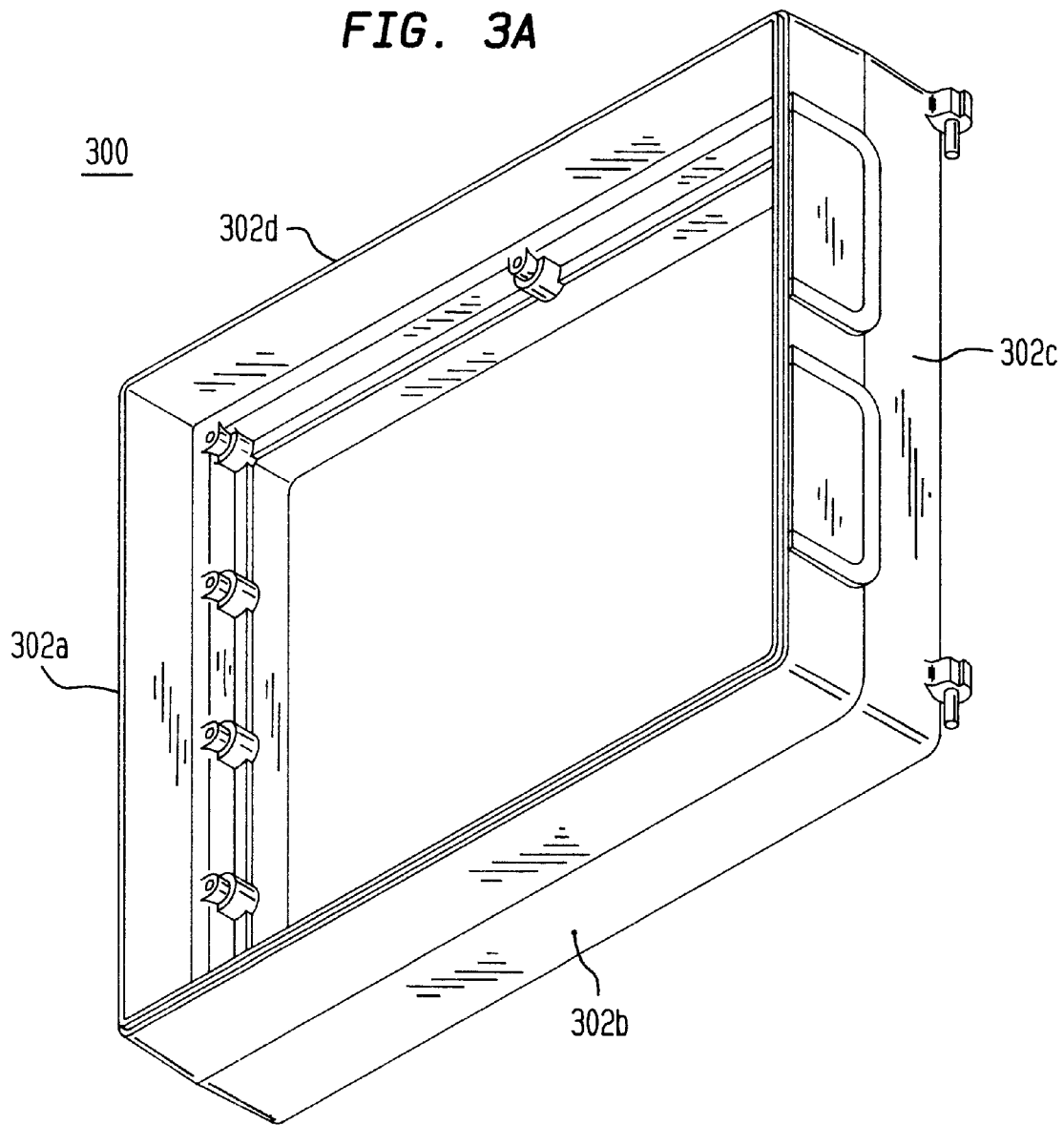

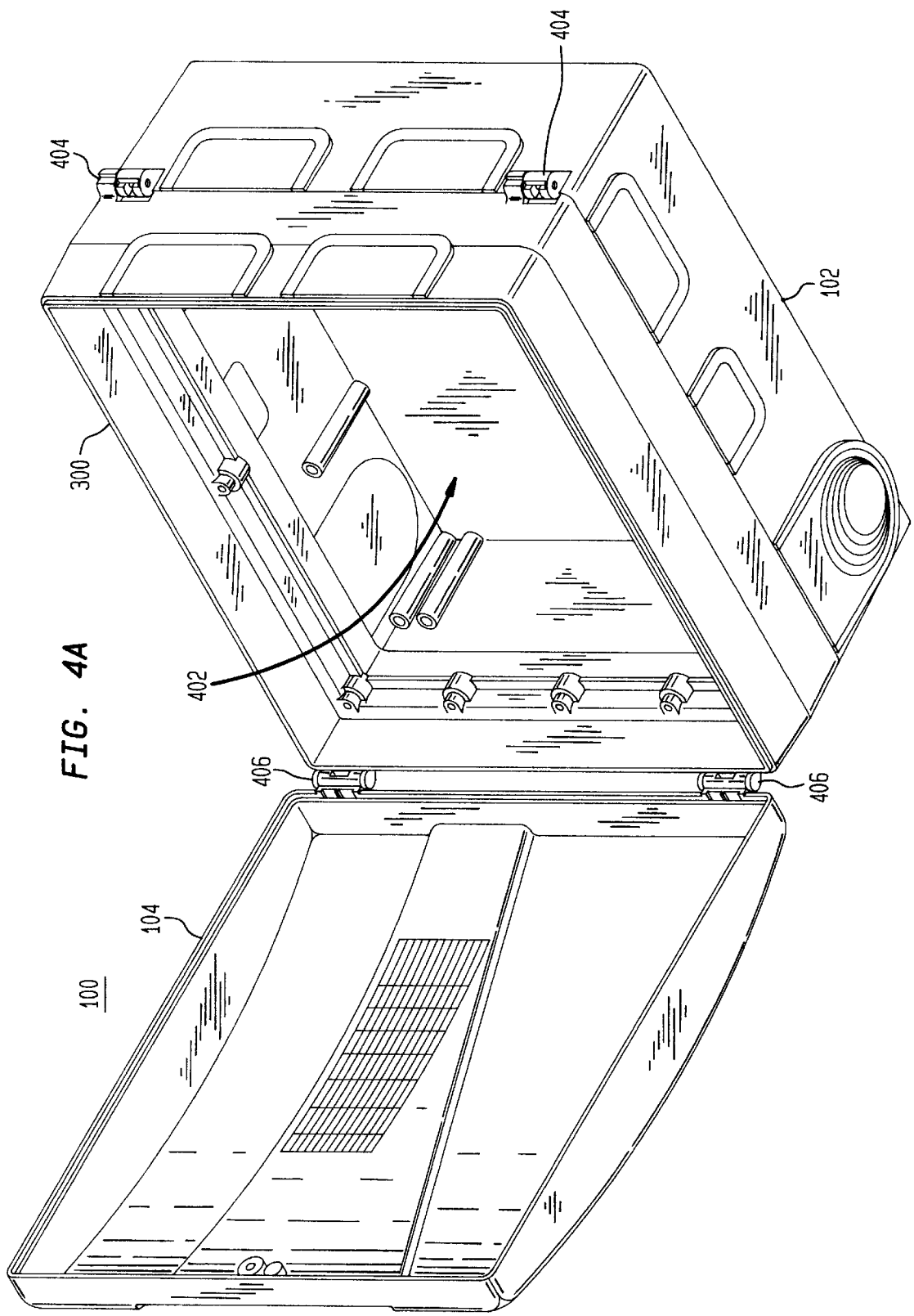

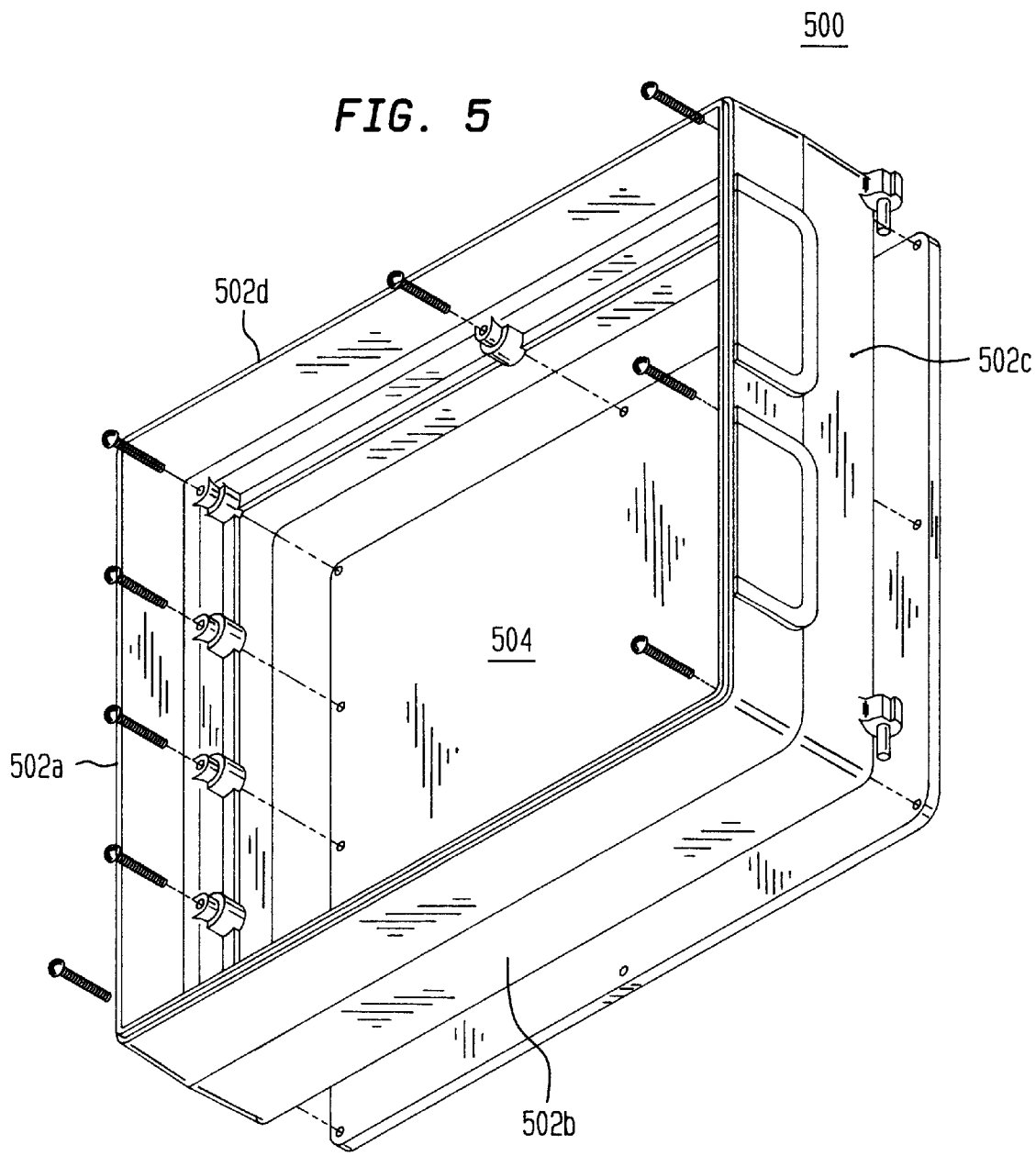

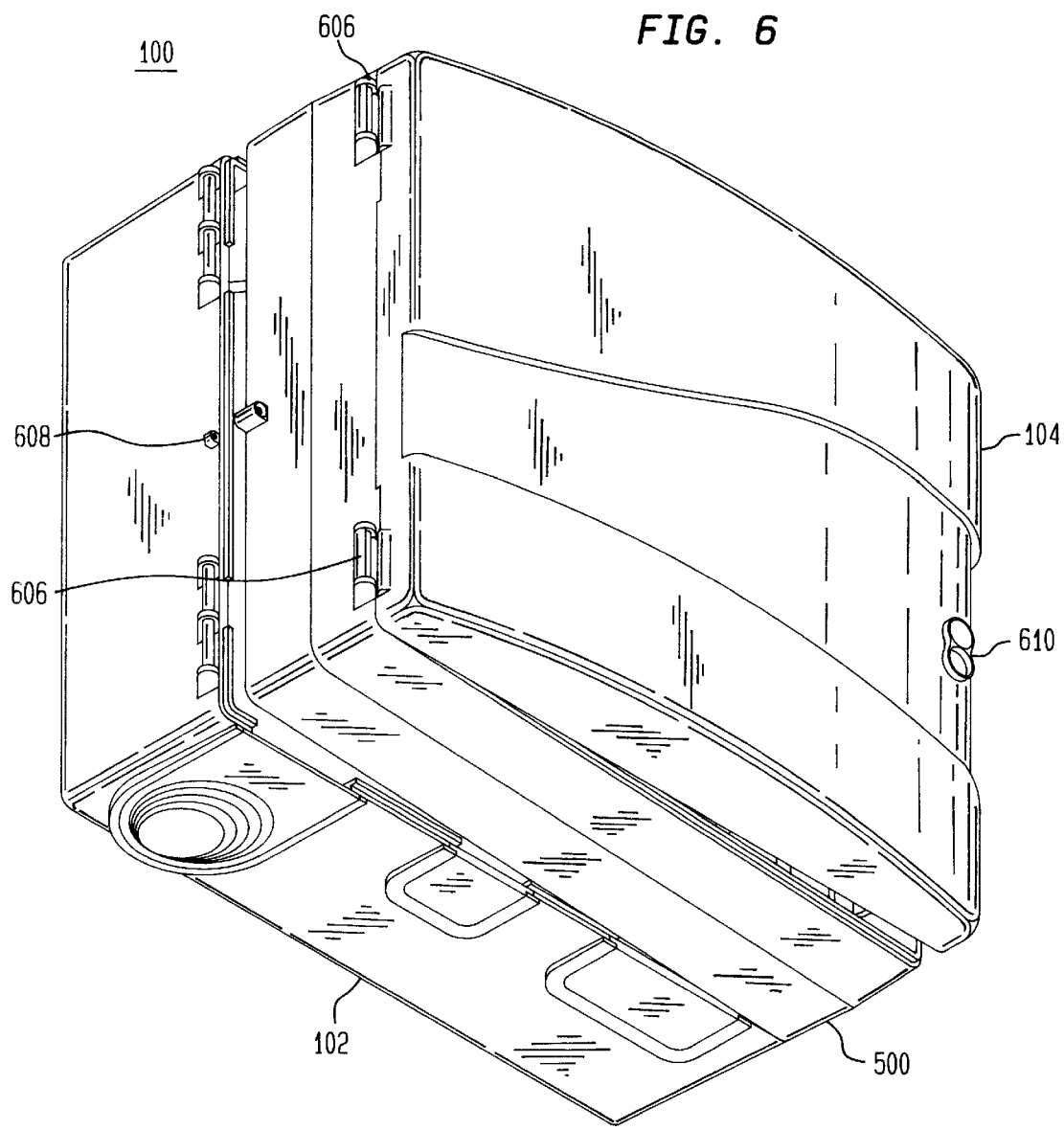

EXPANDABLE ENCLOSURE FOR TELECOMMUNICATIONS APPLICATIONS

BACKGROUND OF THE INVENTION

1. Field of the Invention

The present invention relates to enclosures for telecommunications applications, and, in particular, to enclosures for receiving hardware for splicing and/or connecting to cables carrying telecommunications signals, such as telephone cables carrying telephone signals.

2. Description of the Related Art

Different types of enclosures are used in telecommunications systems for different purposes. For example, a splicing box is used to hold hardware for splicing two cables together, while a connection box is used to hold hardware for interconnecting one or more of the signals carried by a cable to a local network (e.g., the phones of an office building). Conventional enclosures designed for telecommunications systems have a base and a cover pivotally mounted to the base. The base and the cover define a chamber within which the cable and other telecommunications hardware reside.

When an enclosure is used for splicing two cables together, provision is often made to allow for future connection of one or more of the signals to a local network. This typically involves providing an additional length of cabling within the enclosure, so that a separate connection box can be mounted adjacent to the splicing box to provide the connections to the local network. This requires the provision of cable slack as well as the mounting of a separate connection enclosure next to the splicing enclosure.

When an enclosure is used for connecting a cable to a local network, the inside surface of the cover will typically have a label on which the designations for the different connections are listed. As more and more connections are added, however, the enclosure may become too small to hold all of the hardware. In that case, it would be extremely inefficient to have to replace the old enclosure with a new larger enclosure. It would also be inefficient to have to rewrite the list of designations written on the label on the inside surface of the cover.

SUMMARY OF THE INVENTION

The present invention is directed to an expandable enclosure that solves a number of problems and limitations in the prior art. The expandable enclosure of the present invention has a base and a cover that can be pivotally mounted to the base to define a first chamber. The cover can be removed from the base, and a mid layer can be mounted between the base and the cover. In this way, the volume of the enclosure can be increased without disturbing the base or any electrical connections housed within the base.

In one embodiment, the mid layer has four walls, and the expanded enclosure has a larger single chamber than the chamber of the original "unexpanded" enclosure. This embodiment can be applied to the situation where the original enclosure no longer provides enough volume for all of the telecommunications hardware to be housed therein. Furthermore, the same cover with the same connection-designation label is used for the expanded enclosure. As such, the volume of the enclosure is increased without having the replace the base or the cover, and without having to rewrite the connection designations listed on the cover label.

In another embodiment, the mid layer has four walls and a mounting plane mounted substantially perpendicular to the four walls. In this case, the addition of the mid layer converts a one-chamber enclosure into a two-chamber enclosure. This embodiment can be applied to the situation where connections are to be added to a splicing box. In this application, the splicing hardware can reside within the first chamber and the connection hardware can be mounted to one or both sides of the mounting plane to provide connection capability in the second chamber. Moreover, this two-chamber design can be configured to restrict access to the first chamber, which may house electrical isolation hardware in addition to the splicing hardware.

In either case, the enclosure can be expanded without having to replace either the original base or the original cover, and even without disturbing any of the electrical connections that were previously mounted within the base.

BRIEF DESCRIPTION OF THE DRAWINGS

Other aspects, features, and advantages of the present invention will become more fully apparent from the following detailed description, the appended claims, and the accompanying drawings in which:

FIGS. 3 and 3A show perspective views of a mid layer, according to one embodiment of the present invention;

FIGS. 4 and 4A show perspective views of the enclosure of FIG. 1 with the mid layer of FIG. 3 mounted between the base and the cover;

FIG. 5 shows a view of a mid layer, according to an alternative embodiment of the present invention;

FIGS. 6.and 8 show a perspective view and a cross-sectional view, respectively, of the enclosure of FIG. 1 with the mid layer of FIG. 5 mounted between the base and the cover.

DETAILED DESCRIPTION

Figure 1:
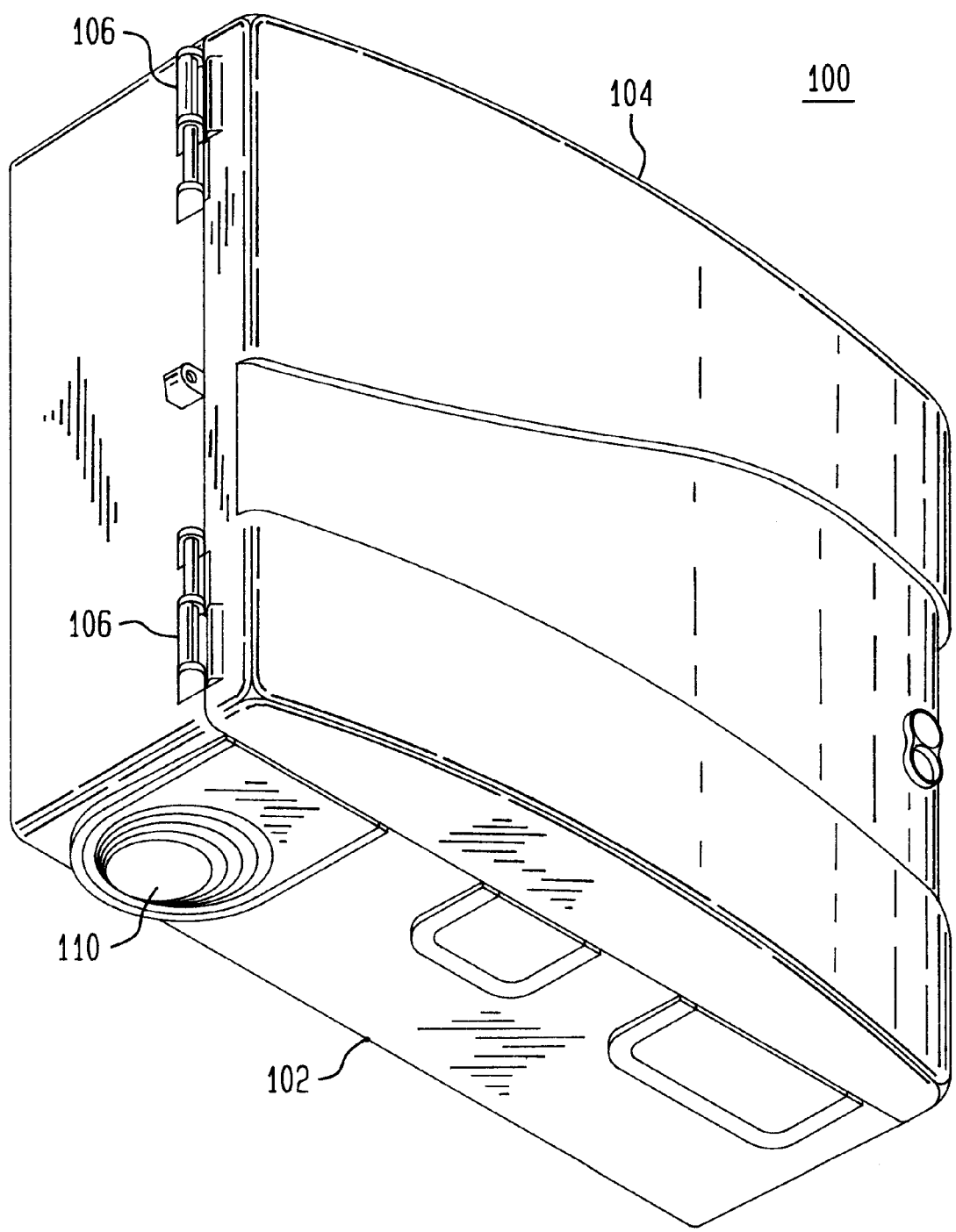
FIGS. 1 and 1A show perspective views of an expandable enclosure in closed and open configurations, according to one embodiment of the present invention.
Figure 1A:
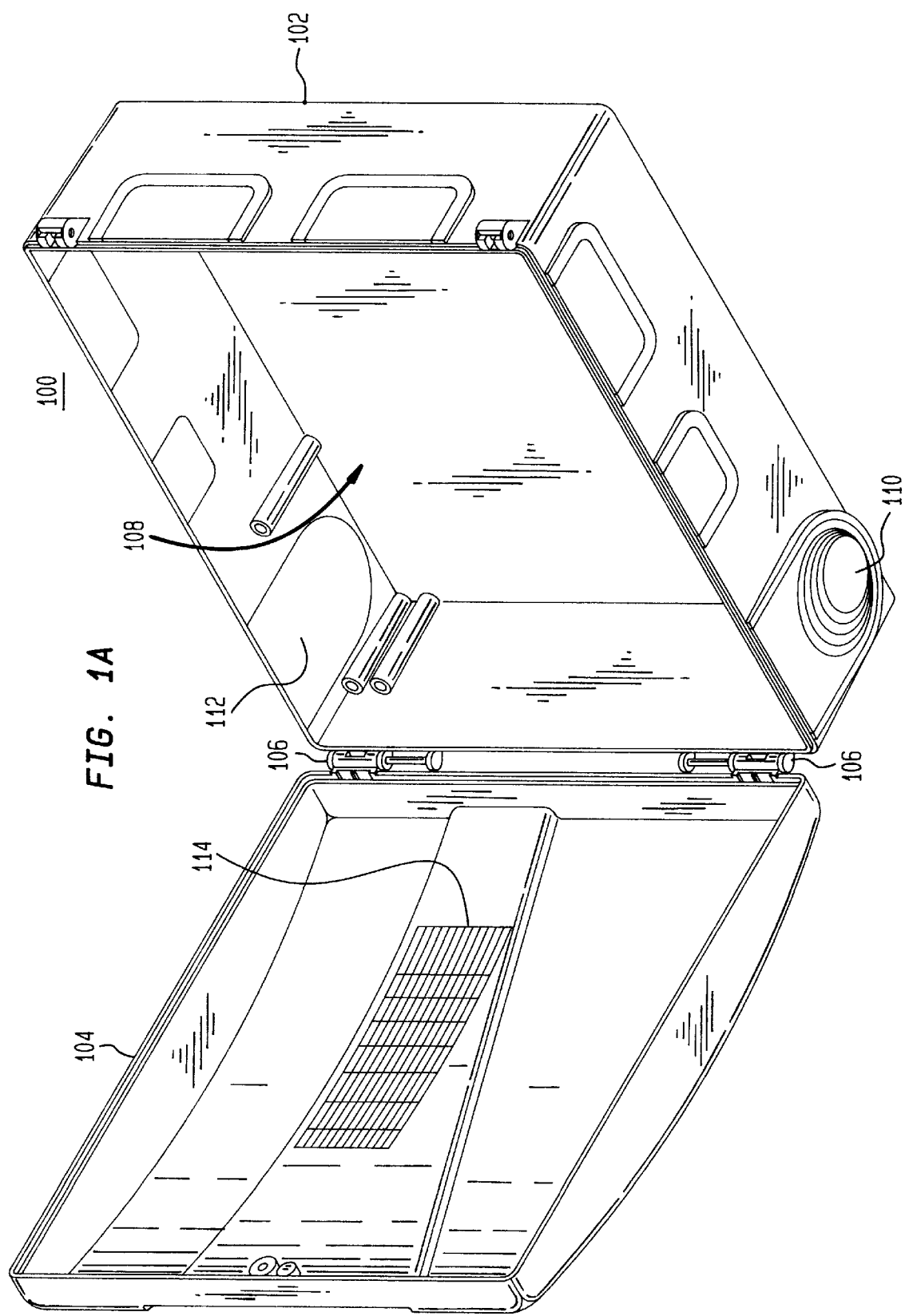

FIGS. 1 and 1A show perspective views of expandable enclosure 100 in closed and open configurations, respectively, according to one embodiment of the present invention. Expandable enclosure 100 comprises base 102 and cover 104, which is pivotally mounted to base 102 at hinges 106. Cover 104 and base 102 define a first chamber 108 of enclosure 100. Chamber 108 is adapted to receive a cable through opening 110 in base 102 as well as telecommunications hardware for splicing/connecting to the cable. When used for splicing, chamber 108 also receives a second cable through a second optional opening 112 in base 102. Depending on the application, enclosure 100 may be used for both splicing and connecting to cables, simultaneously. Cover 104 has an optional label 114 mounted on its inside surface for use in listing the designations of any connections provided by telecommunications hardware mounted within enclosure 100. Hinges 106 are designed such that cover 104 can be removed from base 102.

Figure 2:
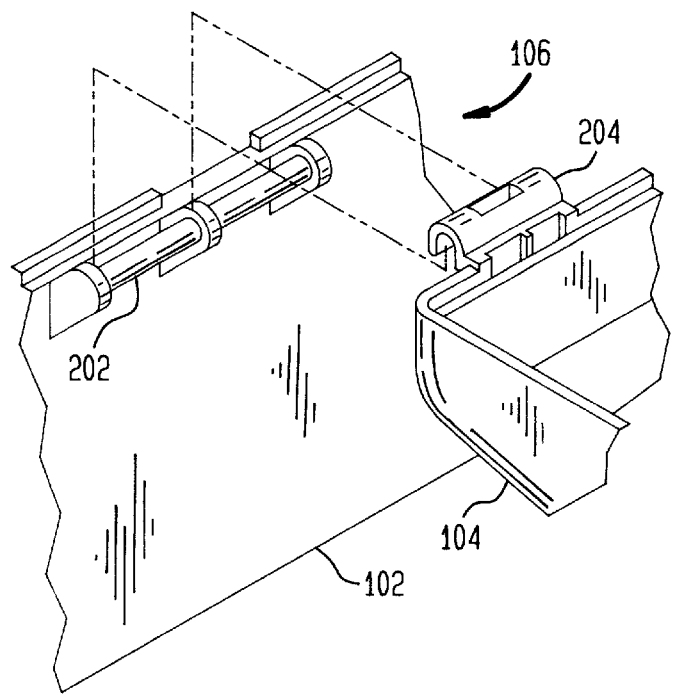
FIG. 2 shows an exploded view of each of the two hinges of the enclosure of FIG. 1.

FIG. 2 shows an exploded view of each of the two hinges 106 of enclosure 100 of FIG. 1. Hinge 106 comprises mounting bar 202, which is preferably an integral part of base 102, and hook 204, which is preferably an integral part of cover 104. Hinge 106 is assembled by forcing the open side of hook 204 over mounting bar 202. With both hinges 106 assembled, cover 104 is pivotally mounted to base 102 with over 180 degrees of movement between the closed position of FIG. 1 and the full open position. FIG. 1A shows cover 104 about half-way between the closed position of FIG. 1 and the full open position. Hinges 106 may be dis-assembled by attempting to force cover 104 beyond the full open position, at which each point hook 204 becomes released from its mounting bar 202.

With cover 104 removed, a mid layer can be mounted between base 102 and cover 104. Depending on the situation, the mid layer can be configured to achieve different desired results. For example, enclosure 100 of FIG. 1 may be used to splice two cables together. In addition, there may be one or more connections between nodes of a local network and one or both of the cables. Over time, the first chamber 108 defined by base 102 and cover 104 may be unable to receive all of the telecommunications hardware needed to provide the desired splicing/connection functions. In that case, a mid layer having four walls may be mounted between base 102 and cover 104 to increase the volume of the first chamber 108.

FIGS. 3 and 3A show perspective views of mid layer 300, according to one embodiment of the present invention. According to this embodiment, mid layer 300 has four walls 302a–d.

Figure 4:
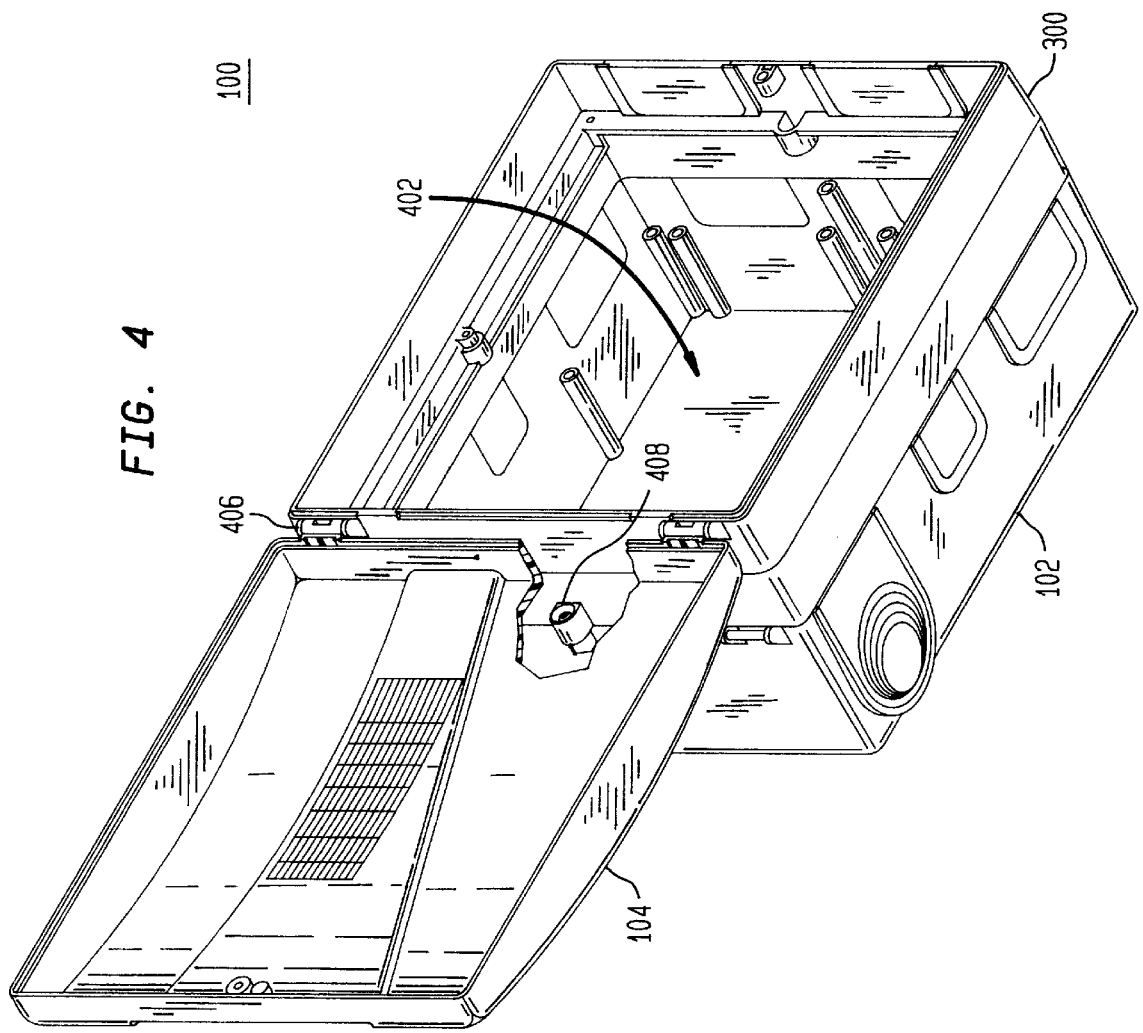

FIGS. 4 and 4A show perspective views of enclosure 100 with mid layer 300 mounted between base 102 and cover 104. With mid layer 300 mounted within enclosure 100, enclosure 100 has a single expanded chamber 402 having a volume greater than that of first chamber 108 of FIG. 1. In this implementation, cover 104 is preferably pivotally mounted to mid layer 300 at hinges 406, which are similar to hinges 106 of FIG. 1. Meanwhile, mid layer 300 is preferably rigidly mounted to base 102. In particular, mid layer 300 is mounted to base 102 at hinges 404 and screw hole 408.

The configuration of FIG. 4 is useful for situations in which an enclosure having a single large chamber is needed. In other situations, it may be desirable to restrict access to some of the telecommunications hardware (e.g., splicing hardware and electrical isolation hardware), while providing access to other hardware (e.g., connection hardware). In this case, a mid layer having four walls and a mounting plane substantially perpendicular to the four walls can be mounted between base 102 and cover 104, so that expanded enclosure 100 will have two chambers—a first chamber for the splicing and electrical isolation hardware and a second chamber for the connection hardware. Access to the first chamber can be restricted by securing the mid layer to the base using a special securing device, such as a KS-type or 216-type screw, in screw hole 408.

FIG. 5 shows a view of mid layer 500, according to an alternative embodiment of the present invention. According to this embodiment, mid layer 500 has four walls 502a–d and a mounting plane 504, substantially perpendicular to the four walls 502a–d.

Figure 8:
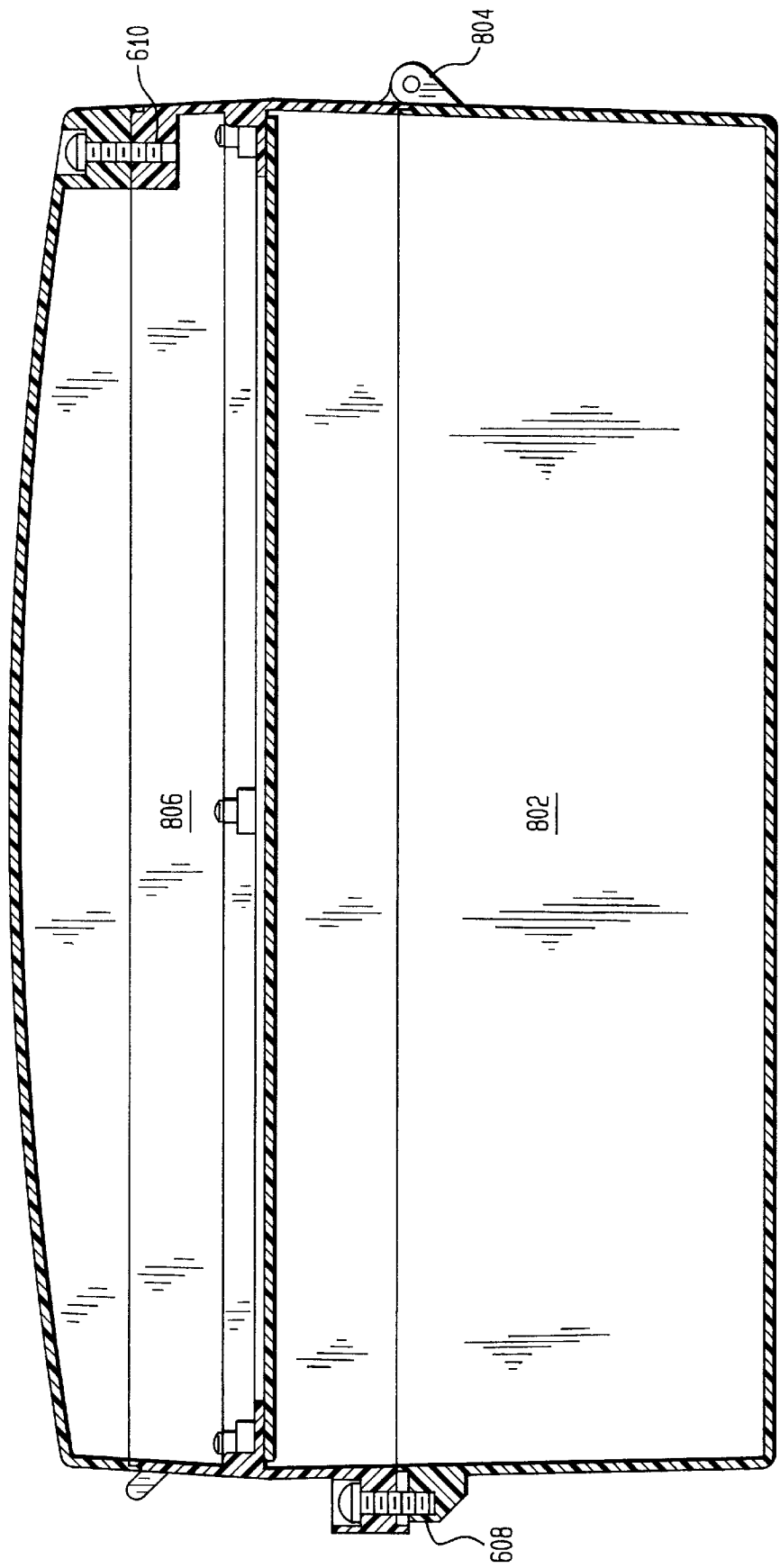

FIGS. 6 and 8 show a perspective view and a cross-sectional view, respectively, of enclosure 100 with mid layer 500 mounted between base 102 and cover 104. Mid layer 500 is pivotally mounted to base 102 at hinges 804 of FIG. 8, while cover 104 is pivotally mounted to mid layer 500 at hinges 606 of FIG. 6. Mid layer 500 can be secured to base 102 using screw hole 608, and cover 104 can be secured to mid layer 500 using screw hole 610. With mid layer 500 mounted within enclosure 100, enclosure 100 has a first chamber 802 and a second chamber 806. With mid layer 500 pivotally mounted to base 102 and cover 104 pivotally mounted to mid layer 300, access can be provided to both the first and second chambers.

In a preferred embodiment, mid layer 500 of FIG. 5 has two separable components: a first component comprising four walls 502a–d and a second component comprising mounting plane 504. The first component is identical to mid layer 300 of FIG. 3, which can be converted into mid layer 500 of FIG. 5 by mounting the second component.

In both of the embodiments of FIGS. 4 and 6, adding the mid layer increases the overall volume of enclosure 100. In the case of FIG. 4, enclosure 100 has a single expanded chamber, while, in the case of FIG. 6, enclosure 100 has two chambers having a greater total volume than chamber 108 of FIG. 1A. In preferred embodiments, cover 104 mounts to the mid layer in the same way that cover 104 mounts to base 102, as shown in FIG. 2.

Figure 7:
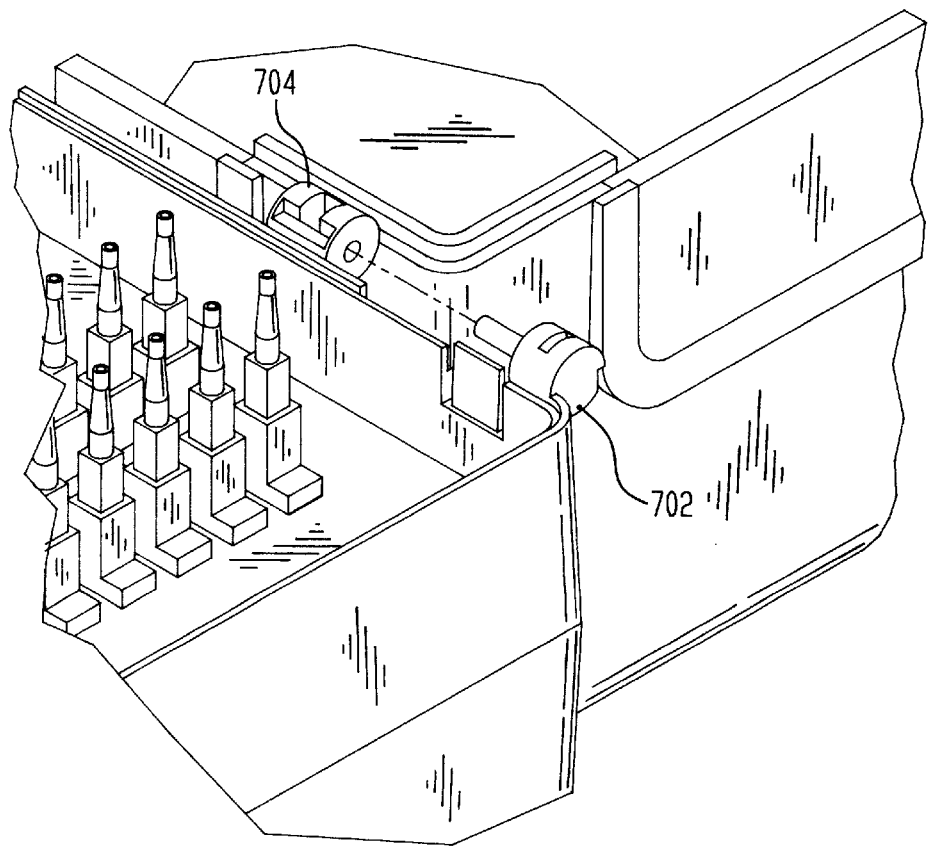
FIG. 7 shows an exploded view of each of the two hinges of FIG. 4 that pivotally mount the mid layer of FIG. 3 to the base, according to one embodiment of the present invention.

FIG. 7 shows an exploded view of each of the two hinges 404 of FIG. 4 that pivotally mount mid layer 300 to base 102, according to one embodiment of the present invention. Hinge 404 comprises male component 702, which is preferably an integral part of mid layer 300, and female component 704, which is preferably an integral part of base 102. Hinge 404 is assembled by forcing male component 702 into female component 704. With hinges 404 assembled, the mid layer is pivotally mounted to base 102 with over 180 degrees of movement between the closed position and the full open position. Hinges 404 may be dis-assembled by forcibly removing male component 702 from female component 704.

In the embodiments shown in FIGS. 1–8, none of the pivoting connections between components—that is, between the cover and the base, between the cover and the mid layer, and between the mid layer and the base—require any additional mounting hardware. In other words, the base, mid layer, and cover are designed as modular components already having the parts necessary for forming complete hinge assemblies.

One important feature of the preferred embodiments of the present invention is that cover 104 can be removed from base 102, the mid layer mounted onto base 102, and cover 104 mounted onto the mid layer, all without dismounting base 102 (e.g., from its position on a wall) and even without disturbing any of the electrical connections that are mounted within base 102. This includes any cable-to-cable splicing connections as well as any connections from a cable to a local network. This means that enclosure 100 can be expanded in the field easily and efficiently, without interrupting any of the telecommunications services provided by the hardware in enclosure 100.

The primary components of enclosure 100 of FIGS. 1, 3, and 5 (i.e., base 102, cover 104, and mid layers 300 and 500) are preferably made of metal diecast (e.g., aluminum or zinc), fabricated sheet metal, or a sturdy molded plastic, such as polycarbonate, ABS, or PVC sold by GE of Pittsfield, Mass.

Enclosures of the present invention can be used for either conventional cables having copper twisted pairs or fiber-optic cables having optical fibers.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An expandable enclosure for telecommunications applications, comprising a base and a cover pivotally and removably mounted to the base, wherein:

the base and the cover define a first chamber adapted to receive a cable and telecommunications hardware for splicing or connecting to the cable;

the base and the cover are adapted to receive a mid layer mounted between the base and the cover, such that the volume of the enclosure is increased for receiving additional telecommunications hardware for splicing or connecting to the cable, wherein the cover is adapted to be removed from the base and the mid layer is adapted to be mounted between the base and the cover without disturbing any existing electrical connections housed within the base;

the cover is adapted to be pivotally mounted directly to the base without requiring any additional mounting hardware;

the cover is adapted to be pivotally mounted directly to the mid layer without requiring any additional mounting hardware; and the mid layer is adapted to be pivotally mounted directly to the base without requiring any additional mounting hardware.

2. The enclosure of claim 1, wherein the mid layer comprises four walls, such that, with the mid layer mounted between the base and the cover, the enclosure has a single expanded chamber having a greater volume than that of the first chamber.

3. The enclosure of claim 2, wherein the mid layer further comprises a removable mounting plane mounted to the four walls, such that, with the mid layer mounted between the base and the cover, the enclosure has the first chamber and a second chamber.

4. The enclosure of claim 1, wherein the mid layer comprises four walls and a mounting plane substantially perpendicular to the four walls, such that, with the mid layer mounted between the base and the cover, the enclosure has the first chamber and a second chamber.

5. The enclosure of claim 4, wherein the mid layer is made from two primary components, a first component comprising the four walls and a second component comprising the mounting plane, wherein the second component is removably mounted within the first component.

6. The enclosure of claim 4, wherein the mid layer is pivotally mounted to the base and the cover is pivotally mounted to the mid layer, to provide access to the first and second chambers.

7. The enclosure of claim 6, wherein access to the first chamber is restricted by securing the mid layer to the base using a security device.

8. An expandable enclosure for telecommunications applications, comprising a base and a cover pivotally and removably mounted to the base, wherein:

the base and the cover define a first chamber adapted to receive a cable and telecommunications hardware for splicing or connecting to the cable;

the base and the cover are adapted to receive a mid layer mounted between the base and the cover, such that the volume of the enclosure is increased for receiving additional telecommunications hardware for splicing or connecting to the cable, wherein the cover is adapted to be removed from the base and the mid layer is adapted to be mounted between the base and the cover without disturbing any existing electrical connections housed within the base;

the mid layer comprises four walls, such that, with the mid layer mounted between the base and the cover, the enclosure has a single expanded chamber having a greater volume than that of the first chamber; and the mid layer further comprises a removable mounting plane mounted to the four walls, such that, with the mid layer mounted between the base and the cover, the enclosure has the first chamber and a second chamber.

9. An expandable enclosure for telecommunications applications, comprising a base and a cover pivotally and removably mounted to the base, wherein:

the base and the cover define a first chamber adapted to receive a cable and telecommunications hardware for splicing or connecting to the cable;

the base and the cover are adapted to receive a mid layer mounted between the base and the cover, such that the volume of the enclosure is increased for receiving additional telecommunications hardware for splicing or connecting to the cable, wherein the cover is adapted to be removed from the base and the mid layer is adapted to be mounted between the base and the cover without disturbing any existing electrical connections housed within the base;

the mid layer comprises four walls, such that, with the mid layer mounted between the base and the cover, the enclosure has a single expanded chamber having a greater volume than that of the first chamber; and the mid layer is rigidly mounted to the base and the cover is pivotally mounted to the mid layer.

10. The enclosure of claim 9, wherein the mid layer further comprises a removable mounting plane mounted to the four walls, such that, with the mid layer mounted between the base and the cover, the enclosure has the first chamber and a second chamber.

11. An expandable enclosure for telecommunications applications, comprising a base and a cover pivotally and removably mounted to the base, wherein:

the base and the cover define a first chamber adapted to receive a cable and telecommunications hardware for splicing or connecting to the cable;

the base and the cover are adapted to receive a mid layer mounted between the base and the cover, such that the volume of the enclosure is increased for receiving additional telecommunications hardware for splicing or connecting to the cable, wherein the cover is adapted to be removed from the base and the mid layer is adapted to be mounted between the base and the cover without disturbing any existing electrical connections housed within the base; and the mid layer comprises four walls and a mounting plane substantially perpendicular to the four walls, such that, with the mid layer mounted between the base and the cover, the enclosure has the first chamber and a second chamber.

12. The enclosure of claim 11, wherein the mid layer is made from two primary components, a first component comprising the four walls and a second component comprising the mounting plane, wherein the second component is removably mounted within the first component.

13. The enclosure of claim 11, wherein the mid layer is pivotally mounted to the base and the cover is pivotally mounted to the mid layer, to provide access to the first and second chambers.

14. The enclosure of claim 13, wherein access to the first chamber is restricted by securing the mid layer to the base using a security device.

* * * * *